(12) United States Patent
Geiger et al.

(10) Patent No.: US 11,694,488 B2
(45) Date of Patent: Jul. 4, 2023

(54) METHOD FOR DETERMINING DAMAGE WHICH OCCURS TO A VEHICLE IN THE EVENT OF AN ACCIDENT BETWEEN A VEHICLE AND A COLLISION PARTNER

(71) Applicant: Bayerische Motoren Werke Aktiengesellschaft, Munich (DE)

(72) Inventors: Michael Geiger, Hebertshausen (DE); Ralf Godau, Puchheim (DE); Wolfgang Hundt, Munich (DE); Milan Koch, Munich (DE); Juergen Krieger, Fuchstal Ot Asch (DE); Johannes Malotta, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 334 days.

(21) Appl. No.: 16/759,911

(22) PCT Filed: Nov. 30, 2018

(86) PCT No.: PCT/EP2018/083108
§ 371 (c)(1),
(2) Date: Apr. 28, 2020

(87) PCT Pub. No.: WO2019/110434
PCT Pub. Date: Jun. 13, 2019

(65) Prior Publication Data
US 2021/0183180 A1    Jun. 17, 2021

(30) Foreign Application Priority Data
Dec. 5, 2017 (DE) .................... 10 2017 221 891.6

(51) Int. Cl.
*G07C 5/08* (2006.01)
*G01L 5/00* (2006.01)
*G06Q 40/08* (2012.01)

(52) U.S. Cl.
CPC .......... *G07C 5/0808* (2013.01); *G01L 5/0052* (2013.01); *G06Q 40/08* (2013.01)

(58) Field of Classification Search
CPC .............. B60R 21/013; B60R 21/0132; B60R 21/0136; B60R 21/01558; B60R 21/0156;
(Continued)

(56) References Cited

U.S. PATENT DOCUMENTS 7,406,376 B2 * 7/2008 Higuchi .............. B60R 21/0132
340/436
9,384,609 B2 * 7/2016 Ricci ...................... G06Q 10/00
(Continued)

FOREIGN PATENT DOCUMENTS

| CN | 102214257 A | 10/2011 | |
|---|---|---|---|
| DE | 10354035 A1 * | 6/2005 | ........... B60R 21/013 |
| DE | 10 2012 000 603 A1 | 10/2012 | |
| DE | 10 2015 212 923 A1 | 1/2017 | |
| DE | 10 2015 011 313 A1 | 3/2017 | |

(Continued)

OTHER PUBLICATIONS

International Search Report (PCT/ISA/210) issued in PCT Application No. PCT/EP2018/083108 dated Feb. 20, 2019 with English translation (six (6) pages).

(Continued)

*Primary Examiner* — Feba Pothen
*Assistant Examiner* — Martin Walter Braunlich
(74) *Attorney, Agent, or Firm* — Crowell & Moring LLP

(57) ABSTRACT

A method determines damage which occurs on the vehicle in the event of an accident between a vehicle and a collision partner. The method analyzes information about an acceleration profile of the vehicle provided by an acceleration sensor. The analysis is performed as to whether the acceleration profile exhibits at least one sudden change or jump. The method generates an output signal which includes an item of information about damage which has occurred on the vehicle in the event of the accident, based on a number of changes or jumps which are identified during the analysis of the acceleration profile.

19 Claims, 6 Drawing Sheets

(58) Field of Classification Search
CPC ....... G01L 5/0052; G01L 5/0061; G01L 5/14; G01M 7/08; G01M 17/00; G01P 15/00; G06Q 40/08; G07C 5/0808; G07C 5/008; G07C 5/006
See application file for complete search history.

(56) References Cited

U.S. PATENT DOCUMENTS

| | | |
|---|---|---|
| 2003/0176959 A1* | 9/2003 | Breed ................. B60N 2/0276 701/36 |
| 2004/0117086 A1 | 6/2004 | Rao et al. |
| 2005/0161920 A1 | 7/2005 | Higuchi et al. |
| 2018/0126937 A1 | 5/2018 | De Silva et al. |

FOREIGN PATENT DOCUMENTS

| | | |
|---|---|---|
| DE | 10 2016 210 773 A1 | 12/2017 |
| WO | WO 01/54952 A2 | 8/2001 |

OTHER PUBLICATIONS

German-language Written Opinion (PCT/ISA/237) issued in PCT Application No. PCT/EP2018/083108 dated Feb. 20, 2019 (five (5) pages).
German-language Office Action issued in German Application No. 10 2017 221 891.6 dated May 4, 2018 (eight (8) pages).
German-language Decision to Grant issued in German Application No. 10 2017 221 891.6 dated Dec. 10, 2019 (five (5) pages).
Chinese-language Office Action issued in Chinese Application No. 201880068469.5 dated Jan. 13, 2022 (15 pages).

* cited by examiner

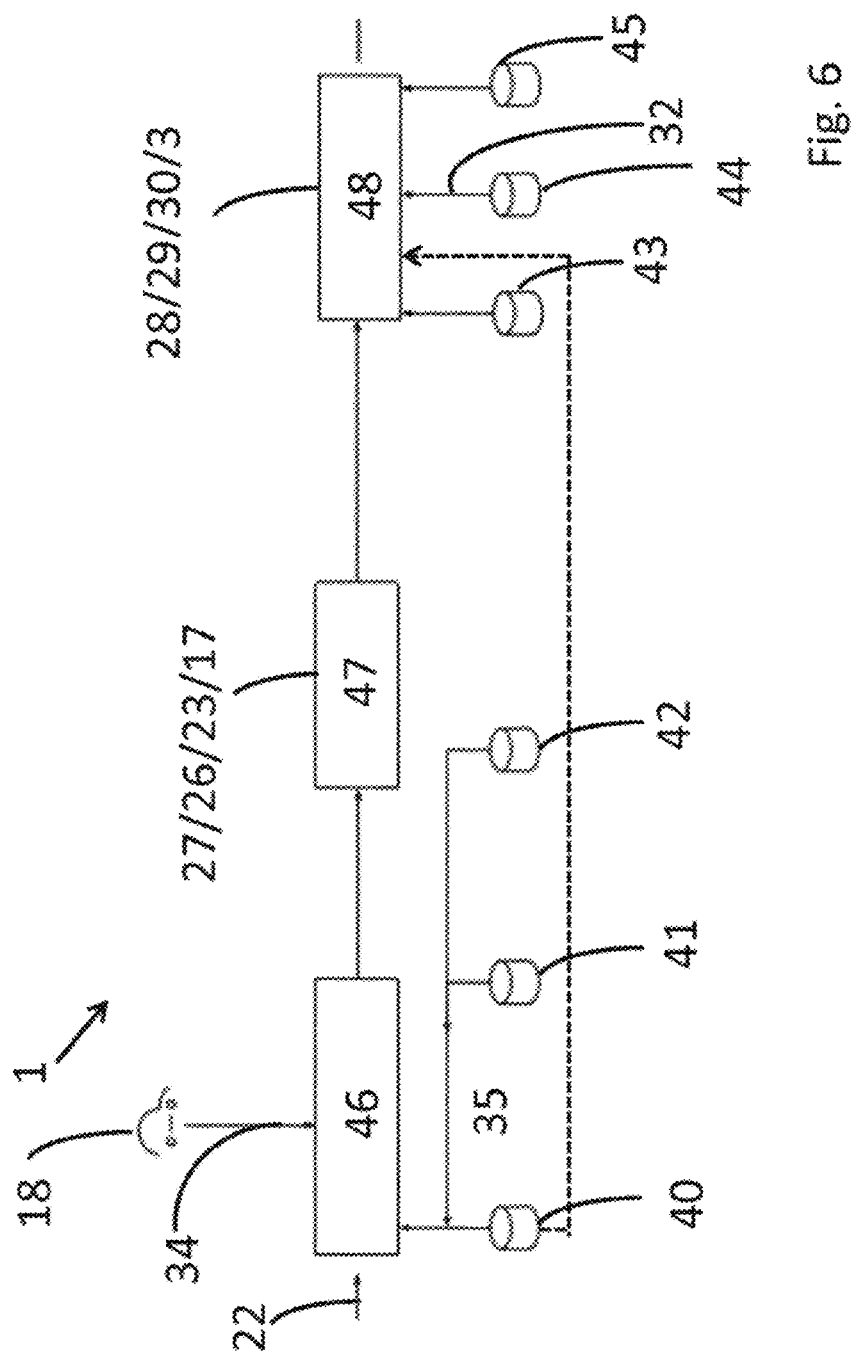

METHOD FOR DETERMINING DAMAGE WHICH OCCURS TO A VEHICLE IN THE EVENT OF AN ACCIDENT BETWEEN A VEHICLE AND A COLLISION PARTNER

BACKGROUND AND SUMMARY OF THE INVENTION

Exemplary embodiments of the present invention relate to a method for determining damage which occurs to a vehicle in the event of an accident between the vehicle and the collision partner, and to a vehicle which is designed to carry out the method.

In the event of an accident, in particular an accident at a low speed, a so-called low-speed crash, it is subsequently often not possible to determine directly whether damage has occurred to a vehicle. For a driver it may then be unclear whether it is possible to drive on without problems or whether possibly a function of important components may be limited. However, even when other accident events occur it may be at least difficult to determine or assess the damage without checking the individual components or parts.

Basically it can be very difficult or at least costly to determine and to assess the precise extent of damage to the vehicle without checking all the parts and components. DE 10 2015 212 923 A1 proposes a method and a system for detecting and assessing low-speed crashes, wherein the accident is also to be assessed, in particular in order to determine the damage which has occurred to a vehicle in the process.

Nevertheless, in order to determine damage it continues to be necessary for the vehicle to be examined by an official expert or some other specialist personnel, for example for determining liability damage, or also in other cases. The scope of repair cannot be defined and replacement parts ordered until after the damage has been determined by specialist personnel. This procedure can under unfavorable circumstances be very time-consuming, expensive and possibly inconvenient for customers.

There is therefore a need to make available a method which is improved and can be automated, for determining damage which occurs to a vehicle in the event of an accident. This need is allowed for by the method and the vehicle according to the independent claims.

Exemplary embodiments relate to a method for determining damage to a vehicle which occurs in the event of an accident between the vehicle and a collision partner. In the method, information about an acceleration profile of the vehicle is made available by an acceleration sensor. The acceleration profile is analyzed to determine whether the acceleration profile has at least one sudden change. An output signal is generated which comprises information about damage which has occurred to the vehicle during the accident. The information about the damage which has occurred is generated on the basis of a number of sudden changes which are detected during the analysis of the acceleration profile. In some exemplary embodiments, improved, in particular automated, determination of damage which has occurred to the vehicle during an accident can be made possible by virtue of the fact that the damage which has occurred is determined from a number of detected sudden changes. Analysis to determine whether the acceleration profile has at least one sudden change can also make it possible, for example, to detect a number of sudden changes in the acceleration profile.

In some exemplary embodiments, the output signal comprises information about rigid areas of the vehicle which are affected by the accident. On the basis of a number of sudden changes which have been detected during the analysis of the acceleration profile it is possible to determine the affected rigid areas. In some exemplary embodiments important information about the severity of the accident or the degree of damage can be acquired from detecting whether there is a connection between sudden changes in the acceleration profile and affected rigid areas of the vehicle. This may be possible, for example, because the severity of the accident, a penetration depth of the collision partner into the vehicle and/or even affected or damaged components can be determined in an automated fashion by means of the affected rigid areas. In other words, important information about the accident can be acquired exclusively through an analysis of a change in the acceleration of the vehicle during the accident. An analysis of the acceleration profile can be carried out in an automated fashion, for example by means of a pattern recognition system, mathematical methods and/or algorithms which are designed to perform pattern recognition and/or carry out corresponding mathematical methods. An actuation device or some other programmable hardware component, for example a controller, can, for example, be designed or programmed to carry out the analysis. For example the number of detected sudden changes can correspond directly to the number of affected rigid areas.

A rigid area of a vehicle may be, for example, an area of a vehicle whose rigidity and whose position in the vehicle are known. Any rigid area of the vehicle can have a homogeneous or specific rigidity which differs from the rigidity of directly adjacent rigid areas. In many vehicles, a further, second rigid area whose rigidity and position differ from the rigidity and position of the first rigid area is arranged adjacent to a first rigid area. The rigidity describes the resistance against deformation. The rigidity of a component or of an area can describe, for example, resistance of a body or an area of a vehicle against elastic and/or plastic deformation by a force or a torque. Rigidity of a component or of an area of a vehicle can depend not only on the elastic properties of a material of the area but also on the geometry of a component or of the area. Different rigid areas may, for example, be arranged in a vehicle in such a way that in the event of an accident a first rigid area which lies furthest outward is deformed and/or damaged first before a further second rigid area which lies further inward is deformed and/or damaged. The deformation of a rigid area may be, for example, plastic and/or elastic deformation. Analogously, a third and/or a fourth rigid area may be arranged on the inside with respect to the first and second rigid areas which are not deformed until the first and the second rigid areas have been deformed. A rigid area which is affected by the accident may be, for example, a rigid area which has been deformed and/or damaged elastically and/or plastically in the event of the accident.

The acceleration profile or information about the acceleration profile may comprise, for example, information about a change in the acceleration of the vehicle over time. The acceleration profile may also be, for example, a deceleration profile of the vehicle. Under certain circumstances, the acceleration signal may have at least one information item about acceleration of the vehicle in at least one direction. The acceleration profile may possibly have at least one information item about the acceleration of the vehicle in precisely two or three different spatial directions. In some exemplary embodiments, if the acceleration changes suddenly it is possible to determine that a rigid area has been deformed. The number of deformed rigid areas, which are therefore affected or damaged by the accident, can be determined in accordance with the number of sudden changes which have been detected in the acceleration profile for the time of the accident.

Additionally or alternatively, the acceleration profile can comprise information about acceleration of a center of gravity of the vehicle. In some exemplary embodiments, the acceleration profile of the vehicle can be generated or made available by a sensor which is arranged at the center of gravity of the vehicle. Under certain circumstances, the sensor which comprises the acceleration profile can also be arranged in the vicinity of a center of gravity of the vehicle, for example at a distance from the center of gravity of less than 10 cm, 5 cm, 1 cm or 0.5 cm. Many vehicles have a sensor which is designed to make available an acceleration profile of the center of gravity of the sensor. Data which is made available with this sensor is used, for example, by different driving assistance systems or safety systems of the vehicle. In some exemplary embodiments it may be sufficient to sense the acceleration profile at just a single point of the vehicle or only to analyze the acceleration profile for a single point on the vehicle. In some exemplary embodiments this can reduce the expenditure because a multiplicity of acceleration values are not acquired at different points on the vehicle and compared with one another as is in the case in many conventional methods.

Additionally or alternatively the method can comprise receiving a time signal which comprises information about a time period for which the acceleration profile is to be analyzed. In some exemplary embodiments this can be ensured by virtue of the fact that all of the sudden changes in the acceleration profile which are relevant for the analysis and the accident can be detected and nevertheless only a relatively small quantity data has to be analyzed.

In some exemplary embodiments, the analysis of the acceleration profile is carried out on the basis of detection of an accident of the vehicle. Detection of an accident can be carried out, for example, on the basis of reception of a detection signal which comprises information on the fact that an accident of the vehicle has been detected. Under certain circumstances this can ensure that the method for assessing damage is carried out only if an accident or a collision with another collision partner has also been detected. For example, the accident may be what is referred to as a low-speed crash in which the vehicle has a speed of less than 30 km/h, 20 km/h, 18 km/h, 17 km/h, 16 km/h or 15 km/h or the like at the time of the accident. In particular in the case of accidents at low speeds, damage often cannot be detected from the outside, and for this reason an automated damage detection process may be advantageous. Of course, the method can also be used in the case of accidents at which the vehicle and/or the collision partner have a relatively high initial speed when they impact with one another.

Some exemplary embodiments of the method also comprise generation of an impact signal which comprises information about the severity of the impact. The information about the severity of the impact is determined on the basis of information about the overall mass of the vehicle, information about the mass of the collision partner, information about an initial speed of the vehicle and information about an initial speed of the collision partner. In some exemplary embodiments, a possible force profile can be provided on the basis of the information about the severity of the impact, and components that have been damaged can possibly be determined even though they lie outside the impact point and/or the affected rigid areas.

Many further exemplary embodiments of the method comprise determining information about an initial speed of the vehicle. This information can be read out, for example, from a memory of the vehicle and/or a memory device of the vehicle. Additionally or alternatively, information about an initial speed of the collision partner can also be determined. For this purpose, for example a sensor signal is evaluated which is generated by a sensor of the vehicle, for example a radar sensor or some other sensor which is designed to make available information about a speed of the collision partner. The initial speed may be, for example, in each case a speed which the vehicle or the collision partner has at the start of the accident, that is to say in the case of an impact.

Further exemplary embodiments of the invention comprise generation of an impact point signal which comprises information about a position or a location of an impact point on the vehicle. In addition, the impact point signal can also comprise information about a direction of the impact. The impact point may be, for example, a point on the vehicle at which contact with the collision partner occurs during the accident. In some exemplary embodiments, in particular if the rigid areas no longer have a uniform extent from one surface to a center point of the vehicle, it is possible as a result to improve, for example, the accuracy of the determination of a penetration depth, of the severity of an impact and/or definitive information about the affected or damaged components.

Additionally or alternatively, the impact point signal can also comprise information about the magnitude of the impact point. In some exemplary embodiments, this permits the damage which is caused during the accident to be determined more precisely. This may be possible, for example, because on the basis of the information about the affected rigid areas and the information about the position and/or magnitude of the impact point it is possible to determine components which lie in the damaged area of the vehicle and have been possibly damaged. The magnitude of the impact point may be, for example, a width and/or a height, a radius, a diameter of the impact point or the like. Both the information about a position as well about the magnitude of the impact point can be determined, for example, on the basis of information of a sensor signal. The sensor signal can be made available, for example, by any sensor of the vehicle which is designed to make available information about a position and/or of the magnitude of the impact point, for example an acceleration sensor, a camera or a camera system of the vehicle. In some exemplary embodiments, information about a position of the impact point can also be determined from an analysis of the acceleration profile, in particular an acceleration profile relating to acceleration of the vehicle in at least two or three different spatial directions.

Additionally or alternately, some exemplary embodiments of the method comprise generation of a vehicle mass signal which comprises information about the overall mass of the vehicle. The overall mass can be generated, for example, on the basis of information about the mass of the vehicle in an empty state and on the basis of information of at least sensor signal. In some exemplary embodiments, this can make it possible to improve determination of information about the severity of an impact, which information includes the information about the overall mass of the vehicle. With the sensor signal it is possible, for example, to make available information about seat occupation and/or filling of a tank. The information about the mass of the vehicle can be received, for example, with a storage signal or be read out from a database or a memory.

In some exemplary embodiments, the method also comprises generation of a mass signal which comprises information about the mass of the collision partner. The determination of the information about the mass of the collision partner is based on a comparison of a dimension of the collision partner with information about a multiplicity of dimensions which a mass is assigned in each case. In some exemplary embodiments, it is possible as a result to determine with a relative precision a variable which is important for the determination of the severity of the impact. By means of a sensor signal, for example a camera sensor or a camera system of the vehicle which is made available by a sensor of the vehicle it is possible to receive, for example, information about a dimension of the collision partner. The information about a multiplicity of dimensions which are each assigned a mass can be received here, for example, with a storage signal or can be read out from a memory or a database.

The information about damage which has occurred at the vehicle can comprise, for example, information about components which are affected by the accident. In order to determine information about the affected components, a storage signal is received which comprises information about components of the vehicle and their position in the vehicle and/or about at least one rigid area assigned to the component. Subsequently, the information of the storage signal is compared with the information of the output signal about the affected rigid areas and/or their position. On the basis of the comparison it is then possible to determine the components of the vehicle which are affected by the accident. For this purpose, a component signal can be generated with the information about the affected components. In some exemplary embodiments this makes it possible to make available information about damage which has occurred for a user.

In some exemplary embodiments of the method, the information about damage which has occurred to the vehicle can also be output. The outputting of the information can be carried out, for example, optically, on a display area, acoustically or in some other way. The information about damaged parts can be transferred, for example to a selected workshop which can then procure the parts promptly. An affected component may be, for example, a component which has been damaged during the accident and/or for which there is at least a risk of damage. These can be components which have to be replaced, repaired or checked.

In addition, in order to determine the information about damage and/or the affected components and/or in order to generate the component signal it is also possible to take into account information about a position of an impact point, information about the size of an impact point and/or information about the severity of the impact. As a result, in some exemplary embodiments damage can be determined very precisely. Under certain circumstances, it is possible, for example, for a damaged area of the vehicle to be delimited very precisely by means of a position of the impact point and the affected rigid areas.

In further exemplary embodiments, a sensor signal is received which comprises information which is made available by at least one other sensor than the sensor which makes available the information about the acceleration profile. In some exemplary embodiments, the accuracy of the determination of the damage can be improved because further information is also included in the determination of the damage. The sensor signal can be made available, for example, by any sensor of the vehicle, for example by a radar sensor, a lidar sensor, a further acceleration sensor, a pressure sensor, a camera or the like.

Additionally or alternatively, an accident data storage signal can also be received which comprises information about accident data from at least one simulation, one trial and/or at least one preceding accident of the vehicle and/or at least one other vehicle. In this context, the accident data items are respectively assigned a damage pattern. The accident data of the accident data storage signal can then be compared with information relating to the accident of the vehicle. In some exemplary embodiments, as a result it is possible to check, for example, whether accident data which are the same as or similar to the information which has been acquired for the accident of the vehicle are already available. If this is the case, it can possibly be assumed that the damage patterns which are assigned to the accident data can also be transferred to the current accident. In some exemplary embodiments accident data items which have each been assigned a damage pattern can be used to make available information as to what damage typically occurs with respect to specific data and/or information which has been acquired for an accident. The accident data may be, for example, acceleration profiles, affected rigid areas, severities of impact, positions and/or sizes of the impact points, information of the sensor signals and/or the like for accidents from trials simulations and/or earlier accidents of the vehicle or of other vehicles. The damage pattern can comprise, for example, information about damaged components and/or effected components, preferably also about a type of damage.

In some exemplary embodiments, the method comprises a machine-learning method. As a result, in some exemplary embodiments the method can be improved with time. This can be possible, for example, because accident events which have already been sensed and the damage which has occurred during said events are included in an assessment of a future accident event. Damage which occurs in the case of an accident can then be determined or assessed, for example, on the basis of information relating to earlier accident events in the past. This may be a case of an accident of the same vehicle or of accident events of another vehicle.

Exemplary embodiments also relate to a vehicle which is designed to carry out the method according to one of the described exemplary embodiments. For this purpose, the vehicle can have, for example, the sensors and/or be designed to transfer the data acquired by the sensors to an actuation device which is designed to carry out the method. Additionally or alternatively, the vehicle can also have the actuation device which is designed to carry out the method according to one of the exemplary embodiments. All the signals which are received in the method according to exemplary embodiments can be received, for example, by a receiver device of the actuation device. Processing of the information or the generation of the signals of the method according to exemplary embodiments can be carried out, for example, by a controller of the actuation device.

Exemplary embodiments are explained in more detail below with reference to the appended figures.

BRIEF DESCRIPTION OF THE DRAWINGS

FIG. 6 is a further schematic illustration of a method for determining damage to a vehicle according to an exemplary embodiment.

DETAILED DESCRIPTION OF THE DRAWINGS

Various exemplary embodiments will now be described in more detail with reference to the appended drawings in which a number of exemplary embodiments are illustrated. In the figures, the thickness dimensions can be illustrated in an exaggerated form by lines, layers and/or areas for the sake of clarity.

Figure 1:
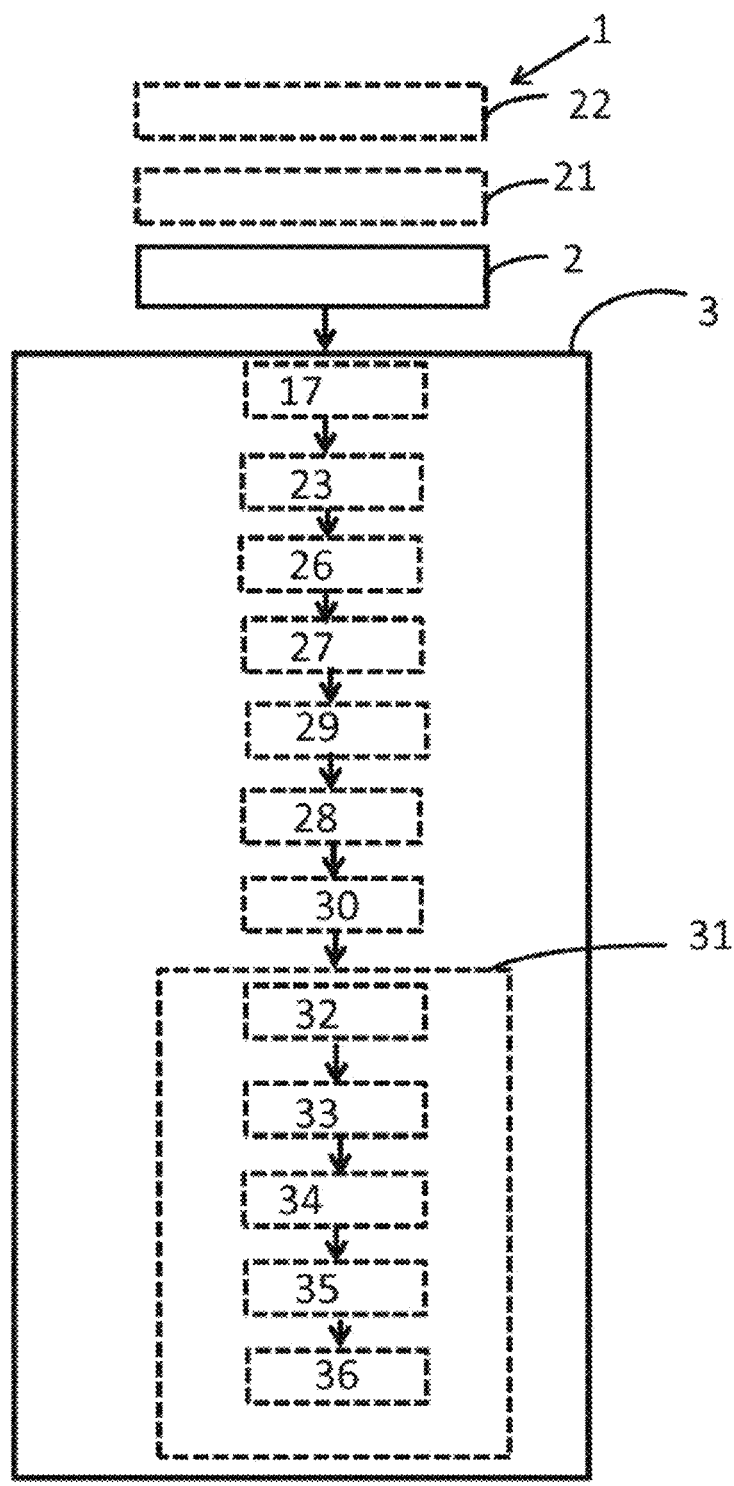
FIG. 1 is a schematic illustration of a method for determining damage which occurs to a vehicle in the event of an accident between the vehicle and a collision partner, according to an exemplary embodiment.

FIG. 1 illustrates a schematic illustration of a method 1 for determining damage which occurs to a vehicle in the case of an accident between the vehicle and a collision partner. An accident may be any event during which contact occurs between a collision partner and a vehicle and/or when the event is detected as an accident. At the time of the accident, both the vehicle and the collision partner may be moving. Alternatively, it can also be the case that only the collision partner or only the vehicle is moving, while the other participant in the accident is stationary. A collision partner may be, for example, any obstacle which may be involved in an accident with the vehicle, for example a barrier, a pillar, a road user, another vehicle, an oncoming vehicle or the like.

Method 1 comprises in a process 2 an analysis of information about an acceleration profile of the vehicle, which is made available by an acceleration sensor. In the analysis in the process 2 it is checked whether the acceleration profile has a sudden change or a multiplicity of sudden changes. The information about an acceleration profile of the vehicle may be, for example, any information about an acceleration or a change in an acceleration of the vehicle over time. The information may be made available, for example, by an acceleration sensor of the vehicle. Furthermore, the information about the acceleration profile of the vehicle may comprise information about the acceleration or a change in acceleration of the vehicle in at least two or three different spatial directions. In some exemplary embodiments, the acceleration profile comprises information about the acceleration of a center of gravity of the vehicle. The acceleration profile can then be made available, for example, by an acceleration sensor which is arranged at a center of gravity of the vehicle or is connected to a component which is arranged at a center of gravity of the vehicle.

Figure 2:
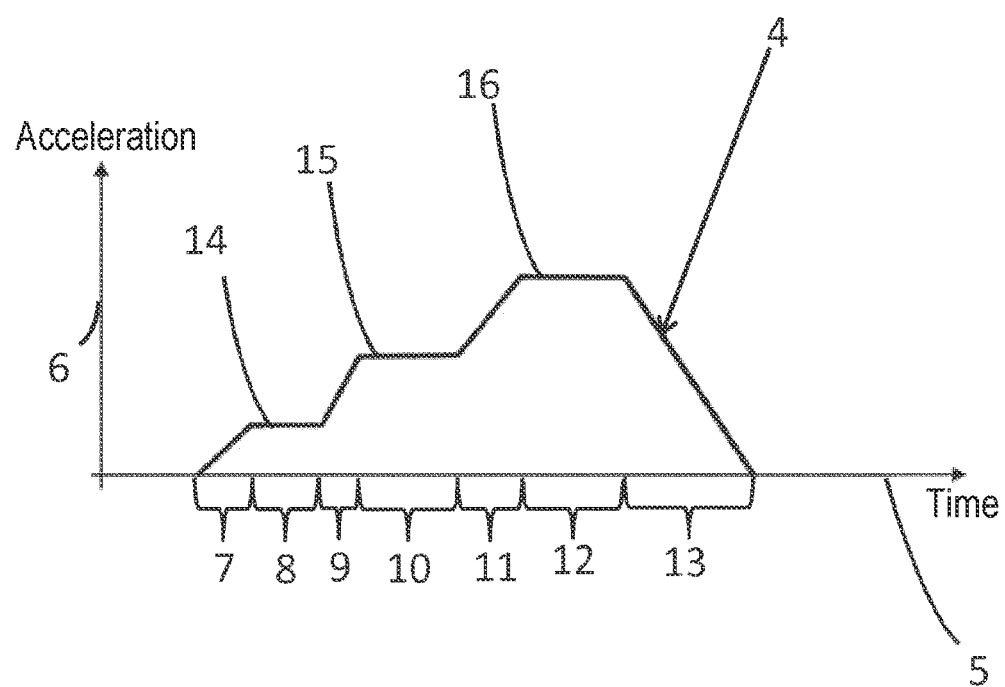
FIG. 2 is a schematic illustration of an acceleration profile of a vehicle in an accident situation.

FIG. 2 shows a schematic illustration of an acceleration profile 4 of a vehicle in an accident situation. In this respect, the acceleration profile 4 of the vehicle is shown in a diagram in which a first axis 5 represents the time and a second axis 6 represents the acceleration. The acceleration profile 4 can be divided into a plurality of sections 7 to 13 which directly adjoin one another. In each of the sections 7 to 13, the profile 4 has a constant gradient which is specific to the section.

In the first time period 7, the gradient of the acceleration profile 4 is positive and indicates an increase in acceleration of the vehicle. In the second time period 8, which directly adjoins the first time period 7, the gradient of the acceleration profile 4 does not change and indicates the constant acceleration of the vehicle. In the third time period 9, which directly adjoins the time period 8, the acceleration profile 4 again has a positive gradient and indicates an increasing acceleration of the vehicle. The acceleration profile 4 has, in the time period 8, a plateau 14 which is detected as a sudden change in the method 1 or the analysis 2. Analogously, the acceleration profile 4 also has, in the time periods 10 and 12, a plateau or a sudden change 15 and 16 which are respectively preceded by a time period 9 or 11 in which the acceleration profile 4 has a positive gradient and indicates an increasing acceleration of the vehicle. In the time period 13, the acceleration profile 4 has a negative gradient and indicates therewith that the acceleration of the vehicle is dropping.

A sudden change in an acceleration profile can occur, for example, if a sudden change in a gradient of the profile or a plateau is detected or is present in a representation of the acceleration of the vehicle plotted against the time. A sudden change in the gradient or the acceleration or a plateau can be present, for example, when the profile has a changing gradient over a defined time period, and the profile does not have any, or has a significantly lower gradient in an adjoining time period than in the preceding time period. The defined time period can comprise any time period, for example at 0.005 ms, 0.008 ms, 0.009 ms, 0.01 or 0.015 ms. For example, the gradient in the area indicated as a plateau or sudden change can have less than 1%, 5%, 10%, 15% or 20% of the gradient in a directly preceding time period. Although in the schematic illustration of the acceleration profile 4 in FIG. 2 all the time periods have a constant gradient, the method 1 or according to other exemplary embodiments can, of course, be applied with acceleration profiles which have time periods in which the gradient changes but is not constant.

Figure 3:
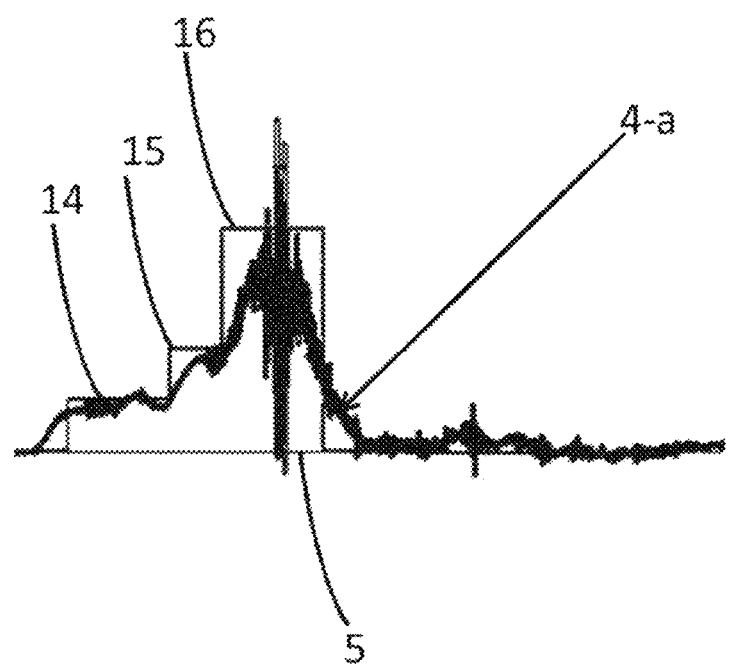
FIG. 3 is a schematic illustration of a further acceleration profile of a vehicle in an accident situation.

FIG. 3 shows a schematic illustration of a further acceleration profile 4-a. Analogously to the profile in FIG. 2, the acceleration profile 4-a in FIG. 3 also represents a diagram in which an acceleration of a vehicle is plotted over time along the axis 5. In the acceleration profile 4-a, the sudden changes or the plateaus cannot be recognized as clearly as in the case of the profile 4 in FIG. 2. The shape of the profile 4-a can be influenced, for example, by the rigidity of the collision partner. The collision partner may in many cases also have differing rigid areas whose deformation can bring about the profile 4-a. The sudden changes 14, 15 and 16 can also be detected through the use of corresponding filters or other methods for signal processing which smooth the profile 4-a.

Of course, an acceleration profile which results, for example from another accident situation can also have more or fewer than three sudden changes, for example no sudden change, one sudden change, two sudden changes, three sudden changes, four sudden changes or another number of sudden changes. In order to analyze the acceleration profile, it is possible, for example, to use any method which is designed to detect sudden changes in an automated fashion, for example without intervention by a person, in particular a number of sudden changes which the profile has, and/or to identify, for example, mathematical methods, pattern comparisons, method from signal processing and/or the like.

After a number of sudden changes have been detected in the acceleration profile 4 or in another acceleration profile, in a process 3 of the method 1 an output signal is generated which comprises information about damage which has occurred to the vehicle during the accident. This takes place on the basis of a number of sudden changes which are detected during the analysis of the acceleration profile 4 or in some other acceleration profile. The damage may be, for example, greater the greater the number of sudden changes which have been detected in the acceleration profile 4.

Information about damage which has occurred to the vehicle during the accident may be, for example, any information with which damage to a vehicle can be classified, for example a list of damaged components and/or components to be checked, information about a time period which a repair lasts or costs which a repair will entail.

In order to generate the output signal in the process 3, in some exemplary embodiments of the method 1 a number of rigid areas of the vehicle which are affected during the accident is determined in a process 17. In this context, rigid areas of the vehicle which are affected by the accident are determined on the basis of the sudden changes detected in the acceleration profile 4. The rigid areas of a vehicle may be, for example, areas of a vehicle which have a specific rigidity and a specific position. Under certain circumstances, the components which are arranged in a rigid area may also be known. The assignment of the affected rigid areas to the sudden changes detected in the acceleration profile 4 is explained on the basis of FIGS. 2, 3 and 4.

Figure 4:
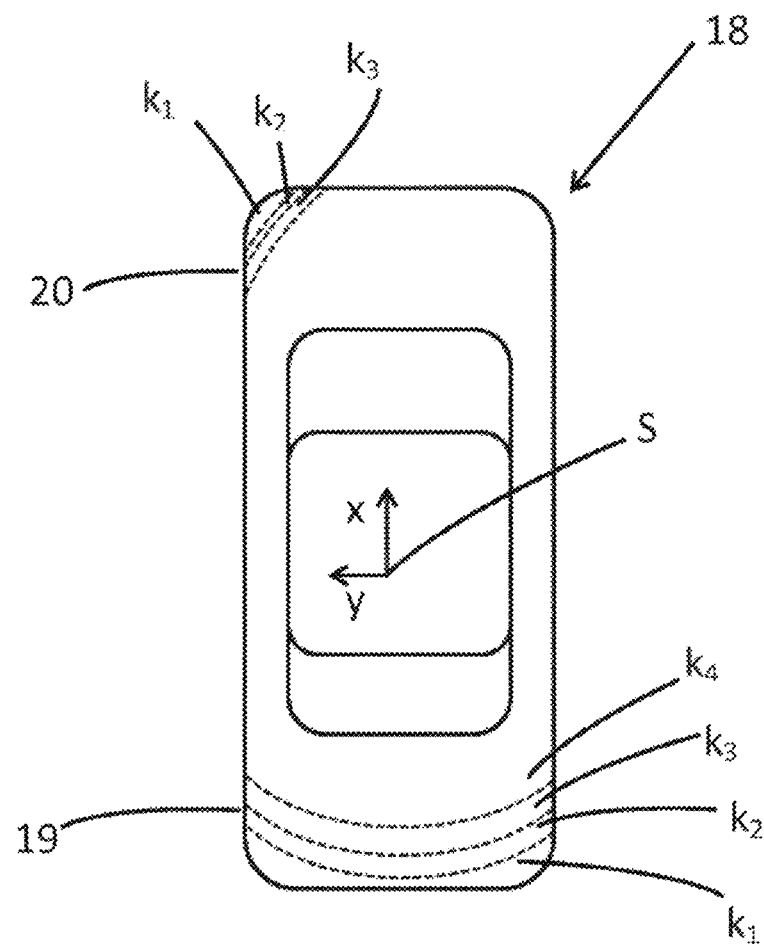
FIG. 4 is a schematic illustration of a multiplicity of rigid areas of a vehicle.

FIG. 4 shows a schematic illustration of a plan view of a vehicle 18. Four rigid areas $k_1$, $k_2$, $k_3$ and $k_4$ are illustrated schematically in a rear area 19 of the vehicle 18. The rigid area $k_1$ is located on the outside of the vehicle 18, for example in the vicinity of a rear bumper of the vehicle 18 or even completely overlaps with the rear bumper of the vehicle 18. In the event of an accident or a collision with a collision partner in the rear area 19, the rigid area $k_1$ is touched and/or deformed first. Further inward, that is to say in the direction of a center of gravity S or in the x direction, the second rigid area $k_2$ directly adjoins the rigid area $k_1$. The rigid area $k_2$ has a degree of rigidity which differs from the rigidity of the rigid area $k_1$. The rigid area $k_2$ which lies further toward the inside in most cases has a higher rigidity level than the rigid area $k_1$ which lies toward the outside. The rigid area $k_2$ is also adjoined directly by the rigid area $k_3$ which lies further toward the inside. The rigid area $k_3$ has a different rigidity level than the rigid area $k_2$. Depending on the vehicle, the rigid area $k_3$ can have a higher or lower rigidity level than the rigid area $k_2$. Analogously, the further rigid area $k_4$ is arranged on the inside with respect to the rigid area $k_3$. A rigid area which has a higher rigidity level than another rigid area is, for example, deformed only by a higher force or a greater torque than the other rigid area. In the vehicle 18 in FIG. 4, the rigid areas $k_1$, $k_2$, $k_3$ and $k_4$ each have, in the rear area 19, the same or a similar thickness or extent in the x direction over the extent in the y direction which corresponds to an extent along a width of the vehicle 18. Of course, the rigid areas in other vehicles can also have a different shape, position and/or extent.

The acceleration profile 4 in FIG. 2 results from a tail-end collision with a collision partner (not illustrated) against the rear area 19 of the vehicle 18. The sudden changes 14, 15 and 16 in the profile 4 in FIG. 2 can be assigned to a deformation of the three rigid areas $k_1$, $k_2$, $k_3$ of vehicle 18. Since the three sudden changes 14, 15 and 16 have been detected in the acceleration profile 4, it is possible to conclude that three rigid areas, in particular the first three rigid areas $k_1$, $k_2$, $k_3$ of the vehicle 18 are affected by the accident. A rigid area which is affected by the accident may, for example have been plastically or elastically deformed during the accident.

Analogously, other areas of the vehicle 18 than the rear area 19 can be divided into rigid areas or have said areas. As is apparent in FIG. 4, three rigid areas $k_1$, $k_2$, $k_3$ can also be arranged in an area 20 on a front side of the vehicle 18 in which a headlight is arranged. The rigid areas $k_1$, $k_2$, $k_3$ in the area 20 of the headlight can have, for example, a width which corresponds to a width of the headlight. The rigid areas $k_1$, $k_2$, $k_3$ in the area 20 of the headlight can, for example, each have the same rigidity level as the respectively correspondingly denoted rigid area in the rear area 19 of the vehicle 18. Of course, the rigid areas in other vehicles in the area of the headlight can also have a different rigidity level than the rigid areas which are arranged in the rear area. Rigid areas and their position and/or rigidity level can also be known for other areas (not illustrated) of the vehicle 18.

The method 1 also comprises, in a process 21, reception of a time signal which comprises information about a time period for which the acceleration profile 4 is to be considered. An analysis of the acceleration profile 4 can be triggered, for example, by detection of an accident in a process 22. In order to detect an accident of the vehicle 18, for example a detection signal can be received which comprises information on whether an accident of the vehicle 18 has been detected. The time period in which the acceleration profile is then considered can comprise, for example, between 1 s and 10 s. The acceleration profile can be analyzed at least or up to 0.5 s, 1 s, 2 s, 3 s, 4 s, 5 s, 6 s or 7 s before the detection of the accident and at least or up to 0.5 s to 2 s, 3 s, 4 s, 5 s, 6 s or 7 s after the detection of the accident. In order to detect the accident or in order to receive the detection signal, for example any method which is designed to detect an accident automatically can be used. A possible method is proposed, for example, in DE 10 2015 212 923 A1. Alternatively, the detection signal can also be received on the basis of a manual input by a user who would like to report the accident.

In addition to the rigid areas affected by the accident, in the method 1 other information relating to the accident can also be acquired in order to determine the information about damage which has occurred to the vehicle 18. For example, for this purpose, in a process 23, an impact point signal is generated which comprises information about a position of an impact point between the vehicle 18 and the collision partner on the vehicle 18. The position of the impact point can describe, for example, the point on the vehicle 18 at which it is in contact with the collision partner, for example an impact height which specifies the distance of the impact point from a roadway and/or a position in the circumferential direction of the vehicle 18 are/is described. By using the information of the impact point signal it is possible to differentiate, for example, whether the three affected rigid areas which have been determined from the analysis of the acceleration profile lie in the rear area 19, in the area 20 of the headlight or in some other area of the vehicle 18. In order to generate the impact point signal it is possible to use, for example, cameras which are present on the vehicle 18 or data made available by these cameras or else the information of other sensor signals which are made available by sensors of the vehicle 18. Additionally or alternatively, the position of the impact point can, for example, also be determined from the acceleration profile.

In some exemplary embodiments the impact point signal can additionally comprise information about a size, for example a width, which can also be referred to as an impact width and/or a height of the impact point. For example, information about an impact vector can also be determined with the position and/or the size of the impact point. The impact vector can indicate, for example, a direction of the accident. For example, the information about the impact vector can be determined from the information of the acceleration profile.

Furthermore, in a process 26, information about an initial speed of the vehicle 18 and information about an initial speed of the collision partner is determined on the basis of information of at least one sensor signal. In order to determine the initial speed of the vehicle 18, for example information can be read out from a control device of the vehicle 18. In order to determine the initial speed of the collision partner, it is possible, under certain circumstances, to take into account the information from further sensor signals, for example of a camera or camera sensors of the vehicle 18. Under certain circumstances, an initial speed of the collision partner can also be determined from information about a differential speed between the vehicle 18 and the collision partner and the known speed of the vehicle 18.

Furthermore, in a process 27, information about a dimension of the collision partner is determined. The dimension of the collision partner can be, for example, a height, a width, a type of the collision partner and/or the like. The information about the dimension can be made available, for example, by a sensor of the vehicle 18, for example a camera of the vehicle 18. The type of the collision partner may be, for example, a type of the collision partner, for example vehicle, vehicle type, animal, barrier, trash can, stationary obstacle or the like.

In a further process 29, a mass signal is generated which comprises information about the mass of the collision partner. For this purpose, for example the dimension, height width and/or type determined for the collision partner can be compared with information of a database or of a storage signal which comprises a multiplicity of height values, width values and/or types and masses assigned to these values.

The method 1 also comprises, in a process 28, generation of a vehicle mass signal which comprises information about the overall mass of the vehicle 18. A basic mass or an unladen weight of the vehicle 18 in an empty state is known. This information can be read out, for example, from a memory or received with a storage signal. By taking into account further information it is possible to determine the current mass of the vehicle 18 relatively precisely. For this purpose, at least one sensor signal can be received which makes available, for example, information about a seat occupation of the vehicle 18 and/or a quantity of a tank filling. The information about the seat occupation can be received, for example, from a sensor which is designed to indicate the occupation of a seat. The information about the seat occupation can have, for example, information about the weight of the person who is occupying the seat. Alternatively, an average weight for a person can be assumed for each occupied seat. The sensor which makes available information about a quantity of the tank filling can be, for example, a filling level sensor or the like which is arranged in a tank of the vehicle 18.

Furthermore, in a process 30 of the method 1, an impact signal is generated which comprises information about the severity of an impact. The severity of the impact can be, for example, the force or energy which is applied to the vehicle and/or the applied impetus in the case of an accident. The severity of the impact can, for example, also be referred to as the height of an impact vector and can be determined, for example, on the basis of the principle of the conservation of energy, as follows:

$$E_{kin1}+E_{kin2}=E_{verf.1+2}+E_{brems1+2},$$

where $E_{kin1}$ is the kinetic energy of the vehicle 18, $E_{kin2}$ is the kinetic energy of the collision partner, $E_{verf.1+2}$ is the energy applied to the vehicle 18 and the collision partner, and $E_{brems1+2}$ is the energy of braking of the vehicle 18 and the collision partner.

For this purpose, for example the information about the impact vector, the impact height, the impact width, the overall mass of the vehicle 18, the mass of the collision partner, the initial speed of the vehicle 18 and the initial speed of the collision partner which have been determined in the preceding processes can be used. Under certain circumstances, further factors, such as for example a rolling movement of the wheels of the vehicle, can be taken into account in the calculation of the severity of the impact during the accident, and/or elasticity and/or deformation of the collision partner can be taken into account. The rolling movement of the wheels during the accident can be determined, for example. Under certain circumstances, a control device of the vehicle 18 can make available information about the distance travelled by the vehicle 18 after the detection of the accident. Alternatively, comparison values, for example estimated values, can also be used. For the elasticity values of the collision partner it is possible also to use comparison values, for example. Alternatively, information about the elasticity of the collision partner can be determined with the mass of the collision partner and/or, in a way analogous to the mass of the collision partner, by means of a corresponding comparison with a database which comprises data about elasticity values of the collision partners.

The method 1, or the generation of the output signal, comprise generation of a component signal in a process 31. The component signal comprises information about the components which are affected by the accident. For this purpose, in a process 32, a storage signal which information about components of the vehicle 18 and their position in the vehicle 18 received. The storage signal can comprise, for example, information about at least one rigid area which is assigned to the component and/or can comprise information about a design of the vehicle 18. This can be, for example, information which indicates the point at which components are located in the vehicle. The information of the storage signal is compared in a process 33 with the information about the position of the impact point and the information about the affected rigid areas. On the basis of the comparison it is possible to obtain information about components which were damaged during the accident or which were possibly damaged. A component of a vehicle can be, for example, any components of a vehicle, for example an electronic component, sensor, part of the bodywork, carrier, headlight, bumper, door, mud flap, tailgate, frame and/or the like.

Of course, further data can also be taken into account in order to determine the components which are affected during the accident. For this purpose, for example in a process 34, a sensor signal or a data signal can be received by a control device of the vehicle 18 and/or a control unit of a component of the vehicle 18. The sensor signal can comprise, for example, information which is made available by at least one other sensor than the sensor which makes available the information about the acceleration profile 4. The sensor signal and/or the data signal can comprise, for example, information about an acceleration, a speed and/or a yaw rate of the vehicle 18. The sensor signal can be made available, for example, by at least or precisely one ultrasonic sensor, one radar sensor, one lidar sensor, one pressure sensor, a microphone and/or other sensors of the vehicle 18. For example information from a fault memory of the vehicle 18 and/or a component of the vehicle 18 can be made available via the data signal of a control unit.

Furthermore, in a process 35 of the method 1 an accident data storage signal is received which comprises information about accident data from simulations, trials and/or accident data from a preceding accident of the vehicle 18 and/or at least one other vehicle. This accident data can be respectively combined with a damage pattern. On the basis of a comparison of the accident data of the accident data storage signal with the information about the accident in a process 36 of the method 1 it is then possible to determine a damage pattern or the affected components of the vehicle 18.

The accident data can, for example, comprise information from a history of the vehicle 18 and/or a history of accidents of other vehicles. This information or the accident data can originate, for example, from trials relating to accidents (crash trials), simulations and/or actual accidents in the form of field data. All the data and/or information which is also taken into account for the vehicle 18 in the case of an accident can be stored as accident data for the trials, simulations and/or actual accidents. For example, the accident data can comprise information about an acceleration or acceleration profiles, speed, yaw rate, data from ultrasonic sensors, radar sensors, lidar sensors, pressure sensors, from a microphone, from fault memories, rigidity values and/or the like from a trial and/or a preceding accident. The accident data which has been acquired for a trail or a preceding accident event can be respectively linked to an associated damage pattern. Accident data which originates from a simulation can comprise, for example, information relating to an acceleration, acceleration profiles, speed, paths, yaw rates, rigidity values, forces and/or force influences for simulated accident events which are also combined with an associated damage pattern. The damage pattern can comprise, for example, information about damaged and/or affected components.

Figure 5:
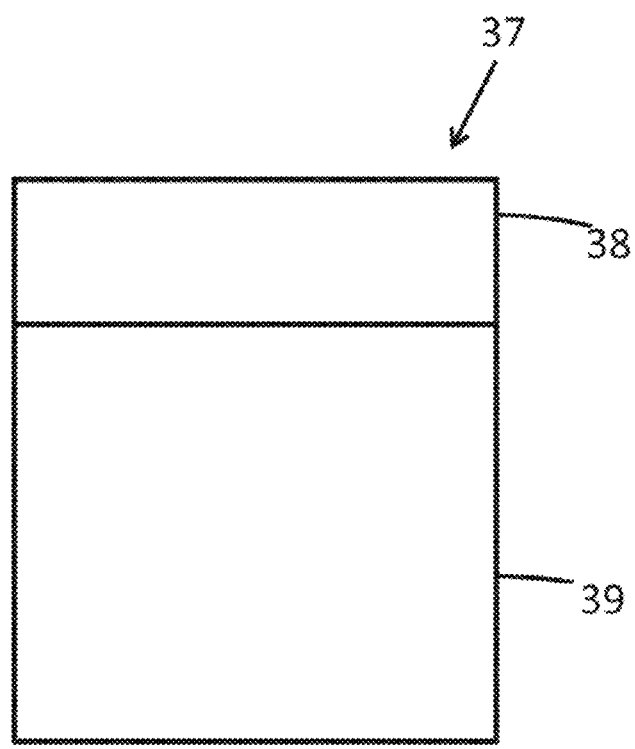
FIG. 5 is a schematic illustration of an actuation device for determining damage to a vehicle according to an exemplary embodiment.

FIG. 5 shows a schematic illustration of an actuation device 37 which is designed to determine damage which occurs to the vehicle 18 in the case of an accident between the vehicle 18 and a collision partner. The actuation device 37 can, for example, also be designed to carry out the method 1 or the method according to other exemplary embodiments.

The actuation device 37 comprises an input device 38 which is designed to receive the information about an acceleration profile 4 of the vehicle 18 which is made available by an acceleration sensor. For this purpose, the input device 38 can receive, for example, a sensor signal or another input signal with the information about the acceleration profile 4. The input device 38 can be any device which is designed to receive at least one of the signals specified in the method 1. For example, the input device 38 can be an interface, a contact, a register or the like.

The input device 38 can also be designed in some exemplary embodiments to receive the detection signal, the memory signal, the accident data storage signal, the sensor signals, the time signal and/or all possible further signals of the method 1 or of a method according to exemplary embodiments.

In addition, the actuation device 37 also comprises a controller 39 which is designed to analyze the acceleration profile 4 of the vehicle 18 and to detect whether the acceleration profile has a sudden change. The controller 39 is also designed to generate the output signal which comprises information about damage which has occurred to the vehicle 18 during the accident, on the basis of a number of sudden changes which are detected during the analysis of the acceleration profile 4. Signals can represent here, for example, a binary, analogue, digital or electrical value or information which is represented by a value. The controller 39 can be any device which is designed to process at least one of the signals specified for the method 1, to carry out the analysis and/or to process the information determined in the method 1 or methods according to exemplary embodiments and to carry out the specified comparisons. For example, the controller can be designed to generate the impact point signal, the vehicle mass signal, the mass signal, the impact signal, the component signal or other signals of the method 1. For example, the controller can be a processor, a digital signal processor, a main processor (CPU=Central Processing Unit), a multipurpose processor (MPP) or the like.

The actuation device 37 can be arranged in the vehicle 18 or in another vehicle which is designed to carry out the method 1 or a method according to exemplary embodiments. In some exemplary embodiments, the actuation device 37 can also be arranged outside the vehicle 18. The vehicle 18 can then be designed to communicate with the actuation device 37.

In the text which follows, a sequence of the method 1 according to an exemplary embodiment which can also be referred to, for example, as a prediction of the extent of damage after a low-speed crash is described with reference to the schematic illustration of the flow diagram in FIG. 6.

The method 1 usually begins with the detection of an accident of the vehicle 18. In the first process 22, an accident is detected or the detection signal is received. This may be what is referred to as a low-speed crash which takes place, for example, at a speed of the vehicle of less than 30 km/h, 25 km/h, 20 km/h, 18 km/h, 17 km/h, 16 km/h or 15 km/h. On the basis of the detection of the accident, signal pre-processing and/or filtering of signals take place in a process 46. The data which are pre-processed or filtered in the process 46 are made available by sensors and/or control units of the vehicle 18. This data may comprise, for example, information about an acceleration, a speed and/or a yaw rate of the vehicle 18. The data can be made available, for example, by at least one or precisely one acceleration sensor, ultrasonic sensor, radar sensor, lidar sensor, pressure sensor, microphone and/or other sensors of the vehicle 18. For example information from a fault memory of the vehicle 18 or a component of the vehicle 18 can be made available by means of the data signal of a control unit. The sensor signal which is received in the process 34 can also, for example, be filtered and/or processed in the process 46. The signal pre-processing can also comprise, for example, determining the time period for which the signals which are made available by the vehicle 18 are considered. Furthermore, within the scope of the signal pre-processing it is possible to prepare, for example smooth or the like, for example by applying a filter, an acceleration profile as in FIG. 3 for analysis.

In FIG. 6, databases 40 to 42 which comprise the accident data are illustrated schematically. In this context, accident data and/or information from trials, for example crash trials, can be stored in the database 40. The database 41 comprises accident data and/or information from field data, that is to say actual accidents. These may be, for example, accidents of the vehicle 18 but also accidents or accident events of other vehicles. The database 42 can comprise, for example, data and/or information from trials, for example simulations. The accident data is respectively a damage pattern which comprises information as to what damage has occurred during the accident. Of course, in other exemplary embodiments it is possible to store all the accident data in a common database.

After the signal pre-processing, in a process 47, from the received data information is determined relating to the accident from the data made available by the vehicle 18.

This includes the determination of information about a position and/or size of the damage point in the process 23, determination of the initial speeds of the vehicle 18 and of the collision partner in the process 26, determination of a dimension of the collision partner in the process 27 as well as determination of a number of rigid areas affected during the accident, in the process 17 or the generation of the corresponding signals. These processes can be carried out, for example, in the sequence specified here or else in another sequence. Under certain circumstances, the process 47 can also be referred to as a calculation of the features 47. In the process 47, solely data and information which is made available by the vehicle 18 or its sensors is used to obtain information on the basis of which the damage which has occurred to the vehicle can then be determined. In some exemplary embodiments, in the process 47, a comparison is not made with information from one of the databases or from another memory.

Subsequently, in a process 48 the components which are affected by the accident are determined. In some exemplary embodiments, the process 48 can comprise classification and a machine learning method. Classification is understood here to mean assessment of the damage which has occurred, in particular determination of the components damaged by the accident. For this purpose, the information which is determined in the process 47 is taken into account with information and comparison data which can be read out, for example, from databases 43, 44 or 45 or received with corresponding storage signals, for example the accident data storage signal.

The database 43 comprises, for example, information about an accident statistic, for example about damage-conducting components and/or components which are dependent on damage-conducting components. Damage-conducting components can be, for example, components which are damaged in a typical accident situation. Components which are dependent on these components can, for example, likewise no longer function if the damage-conducting component is damaged. The database 44 comprises information about a design of the vehicle 18, for example in the form of information as to the point at which specific components are located in the vehicle 18. The information from the database 44 can be made available, for example, with the storage signal which is received in the process 32. The database 45 comprises, for example, information about possible collision partners, for example about the mass of the collision partner with respect to a dimension, a height, a width and/or a type of the collision partner. The information from the database 45 can be read out, for example, in the process 49 in which the mass of the collision partner is determined, and/or can be received by means of a storage signal.

In order to classify 48 the damage, first the total mass of the vehicle 18 and the mass of the collision partner are predicted as described for processes 28 and 29. Subsequently, as already explained for process 30, information about the severity of an impact is determined. For this purpose, of course the signals described for processes 28 to 30 can be generated and received. Subsequently, in the process 31, information about the components affected by the accident are generated. For this purpose, a first prediction of affected components can be carried out. For the first prediction of affected components, the information determined for the vehicle 18 about affected rigid areas and the impact vector which represents, for example, a position and/or a size of the impact point is compared with the information of the database 44. As indicated in FIG. 6, information from the databases 40 to 42 can also be included in the classification. For example, information about affected rigid areas and/or damage patterns assigned to the affected rigid areas can be compared with the rigid areas affected by the accident, in order to determine a damage pattern of the accident or affected components.

A prediction about further components and/or additionally affected components can be made, for example, on the basis of information about the severity of the impact, which can also be referred to, for example, as the height of the impact vector, determined for the vehicle 18, and a comparison with information about force fluxes, an accident statistic, a design of the vehicle 18 and/or further information from one of the databases 40 to 45. On the basis of the comparison it is possible, under certain circumstances, for further components which perhaps lie outside the extent of the impact point to be identified as affected. In other words, a history or data from simulations, trials, field data, preceding accidents of the vehicle 18 and the like can also be taken into account in order to determine the information about the components which are affected by the accident.

Subsequently, on the basis of the information which is included in the classification 48 and which relates to every component affected by the accident, information can be output as to whether the component is to be aligned or replaced and/or not replaced. Possibly, information about a state of the affected component can also be output, for example a percentage indication about fulfilment of a service life or about functional capability. In this context, in some exemplary embodiments a scope of repair of the vehicle 18 can also be determined. The scope can comprise, for example, information about a time period and/or costs of the repair.

The data collected for the vehicle 18 in the process 46 and the information determined in the process 31 about affected components can, for example, be stored or used within the scope of a machine-learning method or a machine-learning model in one of the databases 40 to 42, in particular the database 41, which comprises field data. In particular, information about affected rigid areas and damage patterns assigned thereto can be stored, for example, within the scope of the machine-learning method in one of the databases 40 to 42. Machine learning or a machine learning method can be understood to mean, for example, a method in which information from already detected accident events and damage patterns determined therefor can be used for the assessment of current accident events, in order to improve the assessment.

Individual processes of the method 1 or other exemplary embodiments of the method such as, for example, the reception of signals can run in some exemplary embodiments, for example, in the described sequence and/or in succession. In other exemplary embodiments, the processes of the method can also run simultaneously or at least in a chronologically overlapping fashion and/or in a sequence other than that described.

A further exemplary embodiment is a computer program for carrying out the method 1 according to one of the exemplary embodiments when the computer program runs on a computer, a processor or a programmable hardware component. A further exemplary embodiment is also a digital storage medium which is be machine-readable or computer-readable and which has electronically readable control signals which can interact with a programmable hardware component in such a way that one of the methods described above is executed.

In summary, in some exemplary embodiments of the method 1 damage which has occurred and/or damaged parts on a vehicle 18 can be determined automatically immediately after a low speed crash but also after a crash at a relatively high speed. To do this, a precise extent of damage of all the damaged parts can be determined by means of machine learning algorithms. By means of an analysis and an evaluation of the sensor data of a crash it is possible to determine the location of an accident, as the impact point can also be referred to, an impact vector, impact height and impact depth. The necessary data can be made available completely by sensors of the vehicle 18 which are already present and which are used for crash systems, vehicle movement dynamics control and/or a surroundings sensor system. These include, inter alia, acceleration sensors, pressure sensors as well as radar, ultrasound or camera assistance. In some exemplary embodiments the accuracy can be improved by means of information from a vehicle electronic system, such as for example fault memory entries from control units. In this context, for example a conclusion can be drawn about a damaged headlamp through the corresponding entry in the fault memory. Furthermore, for example, sudden changes in the acceleration profile 4, which, for example, can also be referred to as a deceleration profile, permit a conclusion to be drawn about the regions on the vehicle 18 which are affected by the accident. These sudden changes represent different rigid areas of the vehicle 18 which are known, for example, from tests or simulations. On the basis of the sudden changes it is possible, for example, to determine an impact depth, which can also be referred to as a penetration depth, for example.

In some exemplary embodiments, the machine learning method or machine learning model uses all or some of the abovementioned input variables and uses machine learning algorithms to predict the extent of damage on the basis of the damage patterns from preceding accidents, crash trials and/or simulations. In some exemplary embodiments, damaged components and the extent of damage can be reliably determined as a result by stochastic means. What are referred to as standardized damage patterns, in which damage packages are formed by aggregating vehicle parts, can possibly also be developed on the basis of repair data or expert opinions. For example, in the case of accidents which comprise an impact point front left on the vehicle 18, 95% of five different damage packages may be affected. Therefore, for example a corresponding damage package can be assigned to a damage event. Additionally or alternatively, information from simulation data such as, for example, rigidity levels, force fluxes etc. can be input into the machine learning model as additional information in order to increase the prediction accuracy.

The features disclosed in the above description, the following claims and the appended figures can be significant and implemented either individually or else in any desired combination in order to implement an exemplary embodiment in their various configurations.

LIST OF REFERENCE SYMBOLS

1 Method
2 Analyze
3 Generate output signal
4 Acceleration profile
5 First axis/time
6 Second axis/acceleration
7 Time period
8 Time period
9 Time period
10 Time period
11 Time period
12 Time period
13 Time period
14 Sudden change
15 Sudden change
16 Sudden change
17 Determination of a number of rigid areas affected during the accident
18 Vehicle
19 Rear area
20 Area of headlights
21 Reception of a time signal
22 Reception of a detection signal
23 Generation of an impact point signal
26 Determination of the initial speeds
27 Determination of a dimension of the collision partner
28 Generation of a total mass signal
29 Generation of a mass signal
30 Generation of an impact signal
31 Generation of a component signal
32 Reception of a storage signal with information about components of the vehicle
33 Comparison of the information of the storage signal
34 Receive sensor signal
35 Receive accident data storage signal
36 Compare
37 Actuation device
38 Input device
39 Controller
40 Database
41 Database
42 Database
43 Database
44 Database
45 Database
X Direction
Y Direction
S Center of gravity of the vehicle

What is claimed is:

1. A method for determining damage which occurs to a vehicle in an event of an accident between the vehicle and a collision partner, the method comprising:
analyzing information about an acceleration profile of the vehicle which is made available by an acceleration sensor, wherein whether the acceleration profile has at least one sudden change is determined; and
generating an output signal which comprises information about damage which has occurred to the vehicle during the accident, on the basis of a count of a number of sudden changes which are detected during the analyzing of the acceleration profile,
wherein the output signal changes based on the count of the number of sudden changes such that a first output signal for a first count of the number of sudden changes is different from a second output signal for a second count of the number of sudden changes different from the first count of the number of sudden changes, and
wherein the information about the damage which has occurred to the vehicle comprises at least one of an identification of a damaged component of the vehicle, an identification of a component of the vehicle to be checked, or an identification of a component of the vehicle that may have been affected by the accident.

2. The method according to claim 1, wherein
the output signal comprises information about rigid areas of the vehicle which are affected by the accident, and
the information about the affected rigid areas is determined on the basis of the count of the number of sudden changes which are determined in the analysis of the acceleration profile.

3. The method according to claim 1, wherein
the acceleration profile comprises information about the acceleration of a center of gravity of the vehicle.

4. The method according to claim 1, further comprising:
receiving a time signal which comprises information about a time period for which the acceleration profile is to be analyzed.

5. The method according to claim 4, further comprising:
receiving a detection signal which comprises information about detection of an accident of the vehicle, wherein
the analyzing of the acceleration profile is carried out on the basis of the reception of the detection signal.

6. The method according to claim 5, further comprising:
generating an impact signal which comprises information about a severity of an impact of the accident between the vehicle and the collision partner, wherein
the impact signal is generated on the basis of information about an overall mass of the vehicle, information about a mass of the collision partner and information about, in each case, an initial speed of the vehicle and of the collision partner.

7. The method according to claim 6, further comprising:
generating an impact point signal which comprises information about a position and/or the magnitude of an impact point between the vehicle and the collision partner on the vehicle.

8. The method according to claim 7, further comprising:
generating a vehicle mass signal which comprises information about the overall mass of the vehicle, wherein
the vehicle mass signal is generated on the basis of information about the mass of the vehicle and information of at least one sensor signal.

9. The method according to claim 8, further comprising:
generating a mass signal which comprises information about the mass of the collision partner, wherein
the mass signal is generated on the basis of a comparison of a dimension of the collision partner with information about a multiplicity of dimensions to which a mass is assigned in each case.

10. The method according to claim 9, further comprising:
generating a component signal which comprises information about affected components of the vehicle, on the basis of:
(i) reception of a storage signal which comprises information about components of the vehicle and their position in the vehicle and/or at least one rigid area assigned to the component, and
(ii) comparison of the information of the storage signal with the information of the output signal about the affected storage areas and/or the information of the impact point signal about a position of the impact point.

11. The method according to claim 10, wherein
the generation of the component signal is also carried out on the basis of information about the size of the impact point and/or the information of the impact signal about the severity of the impact of the accident between the vehicle and the collision partner.

12. The method according to claim 10, further comprising:
receiving a sensor signal which comprises information which is made available by at least one other sensor than the sensor which makes available the information about the acceleration profile, and/or
receiving an accident data storage signal which comprises information about accident data from at least one simulation, a trial and/or at least one preceding accident of the vehicle and/or at least one other vehicle, wherein the accident data items are respectively assigned a damage pattern;
comparing the information of the sensor signal, the information about the affected rigid areas and/or the information about the severity of the impact with the information of the storage signal, wherein
the component signal is generated on the basis of the damage pattern which is assigned to the comparison of the information of the sensor signal, of the information about the affected rigid areas and/or of the information about the severity of the impact.

13. The method according to claim 1, further comprising:
receiving a detection signal which comprises information about detection of an accident of the vehicle, wherein
the analyzing of the acceleration profile is carried out on the basis of the reception of the detection signal.

14. The method according to claim 1, further comprising:
generating an impact signal which comprises information about a severity of an impact of the accident between the vehicle and the collision partner, wherein
the impact signal is generated on the basis of information about an overall mass of the vehicle, information about a mass of the collision partner and information about, in each case, an initial speed of the vehicle and of the collision partner.

15. The method according to claim 1, further comprising:
generating an impact point signal which comprises information about a position and/or the magnitude of an impact point between the vehicle and the collision partner on the vehicle.

16. The method according to claim 1, further comprising:
generating a vehicle mass signal which comprises information about the overall mass of the vehicle, wherein
the vehicle mass signal is generated on the basis of information about the mass of the vehicle and information of at least one sensor signal.

17. The method according to claim 1, further comprising a machine learning method.

18. A vehicle, comprising:
a controller operatively configured to execute processing to:
analyze information about an acceleration profile of the vehicle which is made available by an acceleration sensor, wherein whether the acceleration profile has at least one sudden change and a count of a number of sudden changes is determined;
generate a first output signal which comprises first information about damage which has occurred to the vehicle during the accident, on the basis of a first count of the number of sudden changes which are detected during the analyzing of the acceleration profile; and
generate a second output signal which comprises second information about damage which has occurred to the vehicle during the accident, on the basis of a second count of the number of sudden changes which are detected during the analyzing of the acceleration profile, wherein the second output signal is different from the first output signal, and wherein the second count of the number of sudden changes is different from the first count of the number of sudden changes, wherein the information about the damage which has occurred to the vehicle comprises at least one of an identification of a damaged component of the vehicle, an identification of a component of the vehicle to be checked, or an identification of a component of the vehicle that may have been affected by the accident.

19. The method according to claim 1, further comprising:

generating an impact point signal which comprises information about a position and/or a magnitude of an impact point between the vehicle and the collision partner on the vehicle;

determining a damaged area of the vehicle on the basis of the impact signal; and generating a component signal comprising information about affected components of the vehicle that are located in the damaged area.

* * * * *